United States Patent
Li

(10) Patent No.: US 10,033,619 B2
(45) Date of Patent: Jul. 24, 2018

(54) DATA PROCESSING METHOD AND APPARATUS FOR OPENFLOW NETWORK

(71) Applicant: Huawei Technologies Co., Ltd., Shenzhen (CN)

(72) Inventor: Quancai Li, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 45 days.

(21) Appl. No.: 15/289,249

(22) Filed: Oct. 10, 2016

(65) Prior Publication Data

US 2017/0026313 A1  Jan. 26, 2017

Related U.S. Application Data

(63) Continuation of application No. PCT/CN2014/077645, filed on May 16, 2014.

(51) Int. Cl.
*H04L 12/28* (2006.01)
*H04L 12/26* (2006.01)
(Continued)

(52) U.S. Cl.
CPC ............ *H04L 43/16* (2013.01); *H04L 45/245* (2013.01); *H04L 45/64* (2013.01); *Y02B 60/33* (2013.01); *Y02D 50/30* (2018.01)

(58) Field of Classification Search
CPC .......... H04L 12/28; H04L 12/56; H04L 12/26
See application file for complete search history.

(56) References Cited

U.S. PATENT DOCUMENTS

| 6,636,480 B1 | 10/2003 | Walia et al. |
| 2013/0010803 A1* | 1/2013 | Yamaguchi ............ H04L 69/22 370/408 |

(Continued)

FOREIGN PATENT DOCUMENTS

| CN | 1466340 A | 1/2004 |
| CN | 103067534 A | 4/2013 |

OTHER PUBLICATIONS

'OpenFlow Switch Specification,' XP001581639, Version 13.4 (Protocol version 0x04), Open Networking Foundation, Mar. 27, 2014, 171 pages.
(Continued)

*Primary Examiner* — Brandon M Renner
(74) *Attorney, Agent, or Firm* — Conley Rose, P.C.

(57) ABSTRACT

A data processing method and an OpenFlow network are provided. According to the method, after acquiring an aggregation rule from a controller in the OpenFlow network, a switch in the OpenFlow network performs rule matching on to-be-reported data flows according to the aggregation rule. The switch extracts information about data flows matching the aggregation rule in the to-be-reported data flows. Then the switch packetizes and sends the information to the controller, such that the controller determines, according to the information, a forwarding rule for the data flows matching the aggregation rule in the switch. This method avoids that each to-be-reported data flow is sent to the controller using a Packet_In message respectively, such that control channel bandwidth resources consumed by the Packet_In message are reduced. Utilization of the control channel bandwidth resources is improved.

18 Claims, 4 Drawing Sheets

(51) Int. Cl.
*H04L 12/715* (2013.01)
*H04L 12/709* (2013.01)

(56) References Cited

U.S. PATENT DOCUMENTS

| | | | | |
|---|---|---|---|---|
| 2015/0312143 A1* | 10/2015 | Takajo | ................... | H04L 47/10 370/401 |
| 2015/0319094 A1* | 11/2015 | Brockbank | ......... | H04L 47/2483 370/216 |
| 2015/0358231 A1* | 12/2015 | Zhang | ................... | H04L 45/38 370/392 |
| 2016/0050117 A1* | 2/2016 | Voellmy | .............. | H04L 12/6418 370/392 |

OTHER PUBLICATIONS

Ko, N., et al., "OpenQFlow: Scalable OpenFlow with Flow-Based QoS," XP001581639, IEICE Trans. Commun., vol. E96-B, No. 2, Feb. 2013, pp. 479-488.

Foreign Communication From a Counterpart Application, European Application No. 14891784.2, Extended European Search Report dated Mar. 31, 2017, 5 pages.

Foreign Communication From a Counterpart Application, PCT Application No. PCT/CN2014/077645, English Translation of International Search Report dated Feb. 16, 2015, 2 pages.

Foreign Communication From a Counterpart Application, PCT Application No. PCT/CN2014/077645, English Translation of Written Opinion dated Feb. 16, 2015, 6 pages.

\* cited by examiner

DATA PROCESSING METHOD AND APPARATUS FOR OPENFLOW NETWORK

CROSS-REFERENCE TO RELATED APPLICATIONS

This application is a continuation of International Application No. PCT/CN2014/077645, filed on May 16, 2014, the disclosure of which is hereby incorporated by reference in its entirety.

TECHNICAL FIELD

Embodiments of the present disclosure relate to communications technologies, and in particular, to a data processing method and apparatus for an OpenFlow network.

BACKGROUND

OpenFlow is a new network switching model that supports network innovation research. An open flow table of the model allows a user to control a network processing behavior. A basic idea of an OpenFlow network is to implement separation of a data forwarding layer from a control layer, and divides the entire OpenFlow network into a data channel and a control channel. An OpenFlow switch is responsible for forwarding at the data layer, and an OpenFlow controller implements a function of the control layer, such as determining a forwarding rule. A control protocol of the OpenFlow network is the OpenFlow protocol.

In an existing OpenFlow network, after receiving a data packet, the switch checks on a local flow table whether the data packet matches an existing forwarding rule. If the data packet does not match an existing forwarding rule, the data packet is used as a to-be-reported data flow and is reported to the controller using a Packet_in message (report message/packet in message). The controller determines a forwarding rule for the data packet that does not match an existing forwarding rule (for ease of description, a data packet that is in the switch and does not match a forwarding rule is hereinafter referred to as a to-be-reported data flow). If a large quantity of to-be-reported data flows exist in the network, a large quantity of control channel bandwidth resources are consumed, and control channel efficiency is affected.

SUMMARY

Embodiments of the present disclosure provide a data processing method and apparatus for an OpenFlow network, which can reduce impact of a large quantity of to-be-reported data flows in the OpenFlow network on control channel bandwidth resources and control channel efficiency.

According to a first aspect, an embodiment of the present disclosure provides a data processing method for an OpenFlow network, where the method includes acquiring, by a switch in the OpenFlow network, an aggregation rule provided by a controller in the OpenFlow network; performing, by the switch, rule matching on to-be-reported data flows according to the aggregation rule; aggregating, by the switch, data flows matching the aggregation rule to obtain a report message; and sending, by the switch, the report message to the controller using the OpenFlow protocol, so that the controller determines, according to the report message, a forwarding rule for the data flows matching the aggregation rule in the switch.

With reference to the first aspect, in a first possible implementation manner, the performing, by the switch, rule matching on to-be-reported data flows according to the aggregation rule includes performing, by the switch, the rule matching on the to-be-reported data flows according to a match field in the aggregation rule.

With reference to the first possible implementation manner of the first aspect, in a second possible implementation manner, the aggregating, by the switch, data flows matching the aggregation rule to obtain a report message includes generating, by the switch, match information according to the match field, where the match information includes a type of the match field, an identifier of the match field, a length of the match field, mask information of the match field, and a match value of the data flows that matches the aggregation rule; and aggregating, by the switch, data flows matching the aggregation rule to obtain a report message, wherein the report message carries the match information.

With reference to the second possible implementation manner of the first aspect, in a third possible implementation manner, the report message further includes a data information, where the data information is digest data or all data of the data flows matching the aggregation rule.

With reference to the second possible implementation manner or the third possible implementation manner of the first aspect, in a fourth possible implementation manner, the report message further includes a storage address of the data flows matching the aggregation rule in the switch.

With reference to the second or the third or the fourth possible implementation manner of the first aspect, in a fifth possible implementation manner, the report message further includes an identifier of a flow table in which the aggregation rule exists in the switch.

With reference to the first aspect or any one of the foregoing possible implementation manner of the first aspect, in a sixth possible implementation manner, the sending, by the switch, the report message to the controller using the OpenFlow protocol includes extending, by the switch, a Packet_in message format of the OpenFlow protocol; and sending, by the switch, the report message to the controller in the extended Packet_in message format.

According to a second aspect, an embodiment of the present disclosure provides a data processing method for an OpenFlow network, where the method includes providing, by a controller in the OpenFlow network, an aggregation rule for a switch in the OpenFlow network; receiving, by the controller, a report message sent by the switch, where the report message carries information about data flows matching the aggregation rule in the switch; determining, by the controller according to the report message, a forwarding rule for the data flows matching the aggregation rule in the switch; and providing, by the controller, the forwarding rule for the switch, so that the switch processes, according to the forwarding rule, the data flows matching the aggregation rule in the switch.

With reference to the second aspect, in a first possible implementation manner, information of the data flows matching the aggregation rule in the switch includes match information, where the match information includes a type of a match field in the aggregation rule, an identifier of the match field, a length of the match field, mask information of the match field, and a match value of the data flows that matches the aggregation rule; and the determining, by the controller according to the report message, a forwarding rule for the data flows matching the aggregation rule in the switch includes parsing, by the controller, the report message to obtain the match information; and determining, by the controller according to the match information, the forwarding rule for the data flows matching the aggregation rule in the switch.

With reference to the first possible implementation manner of the second aspect, in a second possible implementation manner, the information of the data flows matching the aggregation rule in the switch further includes data information, where the data information is digest data or all data of the data flows matching the aggregation rule in the switch; and the determining, by the controller according to the report message, a forwarding rule for the data flows matching the aggregation rule in the switch includes parsing, by the controller, the report message to obtain the data information and the match information; and determining, by the controller according to the data information and the match information, the forwarding rule for the data flows matching the aggregation rule in the switch.

With reference to the second aspect, or the first or the second possible implementation manner of the second aspect, in a third possible implementation manner, the report message further carries a storage address, in the switch, of the data flows matching the aggregation rule in the switch; and the providing, by the controller, the forwarding rule for the switch, so that the switch processes, according to the forwarding rule, the data flows matching the aggregation rule in the switch includes sending, by the controller, the forwarding rule and the storage address to the switch, so that the switch processes, according to the forwarding rule, the data flows that match the aggregation rule and are temporarily stored in the storage address.

According to a third aspect, an embodiment of the present disclosure provides a switch for an OpenFlow network, where the switch includes an acquiring unit configured to acquire an aggregation rule provided by a controller in the OpenFlow network; a processing unit configured to perform rule matching on to-be-reported data flows in the switch according to the aggregation rule, and aggregate data flows matching the aggregation rule to obtain a report message; and a sending unit configured to send the report message to the controller using the OpenFlow protocol, so that the controller determines, according to the report message, a forwarding rule for the data flows matching the aggregation rule in the switch.

With reference to the third aspect, in a first possible implementation manner, the processing unit is configured to perform the rule matching on the to-be-reported data flows in the switch according to a match field in the aggregation rule.

With reference to the first possible implementation manner of the third aspect, in a second possible implementation manner, the processing unit is configured to generate match information according to the match field, where the match information includes a type of the match field, an identifier of the match field, a length of the match field, mask information of the match field, and a match value of the data flows that matches the aggregation rule, and aggregate data flows matching the aggregation rule to obtain a report message, where the report message carries the match information.

With reference to the second possible implementation manner of the third aspect, in a third possible implementation manner, the report message further includes a data information, where the data information is digest data or all data of the data flows matching the aggregation rule.

With reference to the second possible implementation manner or the third possible implementation manner of the third aspect, in a fourth possible implementation manner, the report message further includes a storage address of the data flows matching the aggregation rule in the switch.

With reference to the second possible implementation manner or the third possible implementation manner or the fourth possible implementation manner of the third aspect, in a fifth possible implementation manner, the report message further includes an identifier of a flow table in which the aggregation rule exists in the switch.

With reference to the third aspect, or any one of the foregoing possible implementation manners of the third aspect, in a sixth possible implementation manner, the sending unit is configured to extend a Packet_in message format of the OpenFlow protocol, and send the report message to the controller in the extended Packet_in message format.

According to a fourth aspect, an embodiment of the present disclosure provides a controller for an OpenFlow network, where the controller includes a sending unit configured to provide an aggregation rule for a switch in the OpenFlow network; a receiving unit configured to receive a report message sent by the switch, where the report message carries information about data flows matching the aggregation rule in the switch; a determining unit configured to determine, according to the report message, a forwarding rule for the data flows matching the aggregation rule in the switch; and a providing unit configured to provide the forwarding rule for the switch, so that the switch processes, according to the forwarding rule, the data flows matching the aggregation rule in the switch.

With reference to the fourth aspect, in a first possible implementation manner, information of the data flows matching the aggregation rule in the switch includes match information, where the match information includes a type of a match field in the aggregation rule, an identifier of the match field, a length of the match field, mask information of the match field, and a match value of the data flows that matches the aggregation rule; and the determining unit is configured to parse the report message to obtain the match information, and determine, according to the match information, the forwarding rule for the data flows matching the aggregation rule in the switch.

With reference to the first possible implementation manner of the fourth aspect, in a second possible implementation manner, the information of the data flows matching the aggregation rule in the switch further includes data information, where the data information is digest data or all data of the data flows matching the aggregation rule in the switch; and the determining unit is configured to parse the report message to obtain the data information and the match information, and determine, according to the data information and the match information, the forwarding rule for the data flows matching the aggregation rule in the switch.

With reference to the fourth aspect, or the first or the second possible implementation manner of the fourth aspect, in a third possible implementation manner, the report message further carries a storage address, in the switch, of the data flows matching the aggregation rule in the switch; and the providing unit is configured to send the forwarding rule and the storage address to the switch, so that the switch processes, according to the forwarding rule, the data flows that match the aggregation rule and are temporarily stored in the storage address.

According to a fifth aspect, an embodiment of the present disclosure provides a switch for an OpenFlow network, where the switch includes a processor, a memory, a bus, and a communications interface, where the memory is configured to store a computer-executable instruction; the processor and the memory are connected through the bus; and when the switch runs, the processor executes the computer-executable instruction stored in the memory, so that the switch executes the data processing method for an OpenFlow network according to the first aspect or the data processing method for an OpenFlow network according to any one of possible implementation manner of the first aspect.

According to a sixth aspect, an embodiment of the present disclosure provides a controller for an OpenFlow network, where the controller includes a processor, a memory, a bus, and a communications interface, where the memory is configured to store a computer-executable instruction; the processor and the memory are connected through the bus; and when the controller runs, the processor executes the computer-executable instruction stored in the memory, so that the controller executes the data processing method for an OpenFlow network according to the second aspect or the data processing method for an OpenFlow network according to any one of possible implementation manner of the second aspect.

According to a seventh aspect, an embodiment of the present disclosure provides a computer-readable medium, including a computer-executable instruction, so that when a processor of a computer executes the computer-executable instruction, the computer executes the data processing method for an OpenFlow network according to the first aspect or the data processing method for an OpenFlow network according to any one possible implementation manner of the first aspect.

According to an eighth aspect, an embodiment of the present disclosure provides a computer-readable medium, including a computer-executable instruction, so that when a processor of a computer executes the computer-executable instruction, the computer executes the data processing method for an OpenFlow network according to the second aspect or the data processing method for an OpenFlow network according to any one possible implementation manner of the second aspect.

In the embodiments of the present disclosure, a switch in an OpenFlow network may perform rule matching on to-be-reported data flows according to an aggregation rule provided by a controller, aggregate data flows matching the aggregation rule to obtain a report message, and send the report message to the controller using the OpenFlow protocol, so that the controller can determine, according to the report message, a forwarding rule for the data flows matching the aggregation rule. This method avoids that each to-be-reported data flow is reported to the controller using a Packet_In message, thereby reducing impact of a large quantity of to-be-reported data flows in the OpenFlow network on control channel bandwidth resources and control channel efficiency, and improving utilization of the control channel bandwidth resources.

BRIEF DESCRIPTION OF DRAWINGS

To describe the technical solutions in the embodiments of the present disclosure more clearly, the following briefly describes the accompanying drawings required for describing the embodiments or in the prior art. The accompanying drawings in the following description show merely some embodiments of the present disclosure.

DESCRIPTION OF EMBODIMENTS

Figure 1:
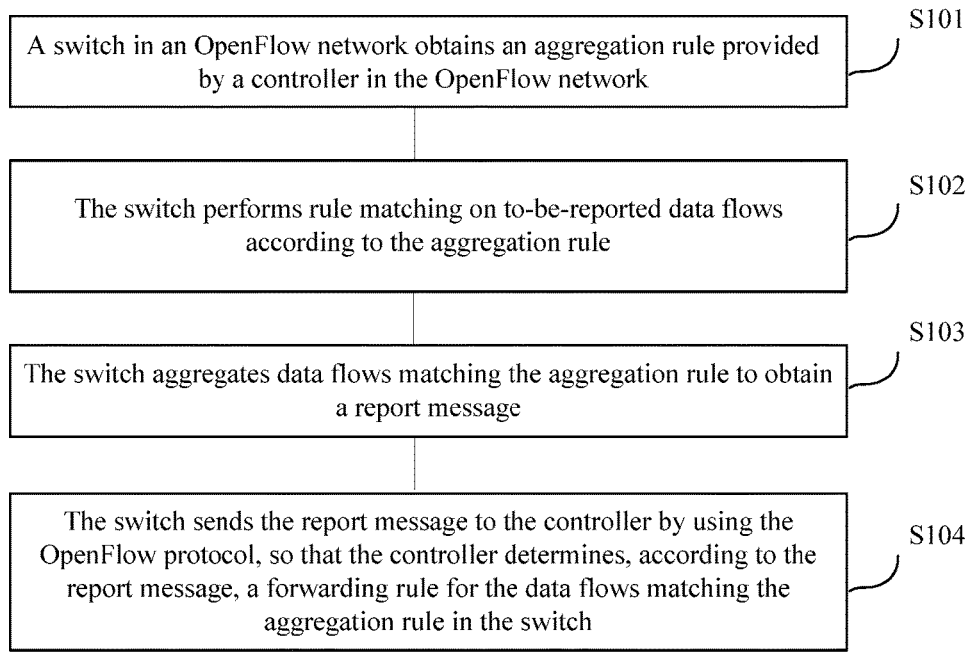
FIG. 1 is a flowchart of a data processing method for an OpenFlow network according to an embodiment of the present disclosure.
Figure 2:
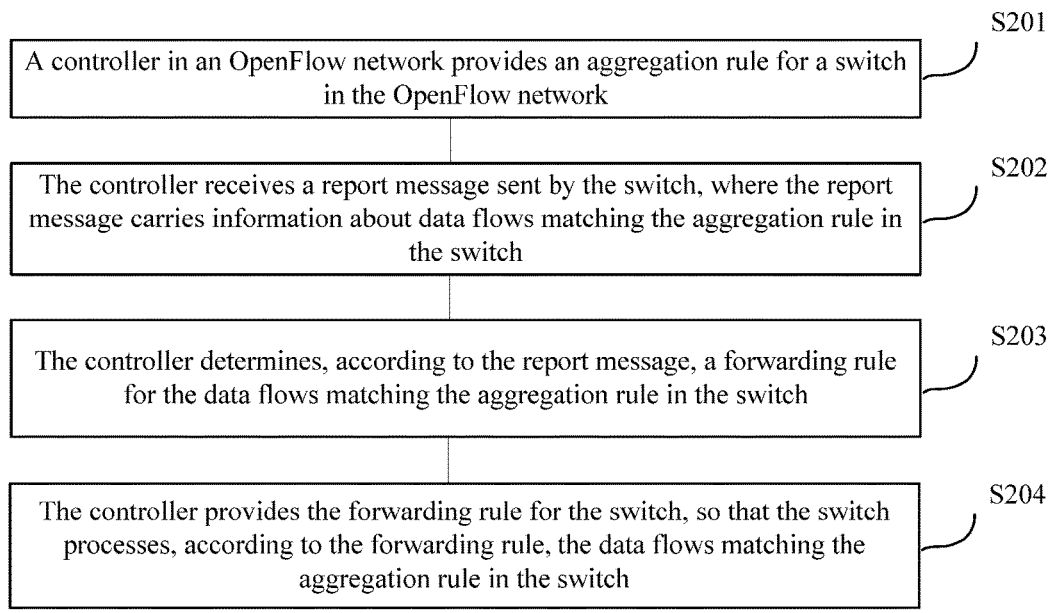
FIG. 2 is a flowchart of another data processing method for an OpenFlow network according to an embodiment of the present disclosure.
Figure 3:
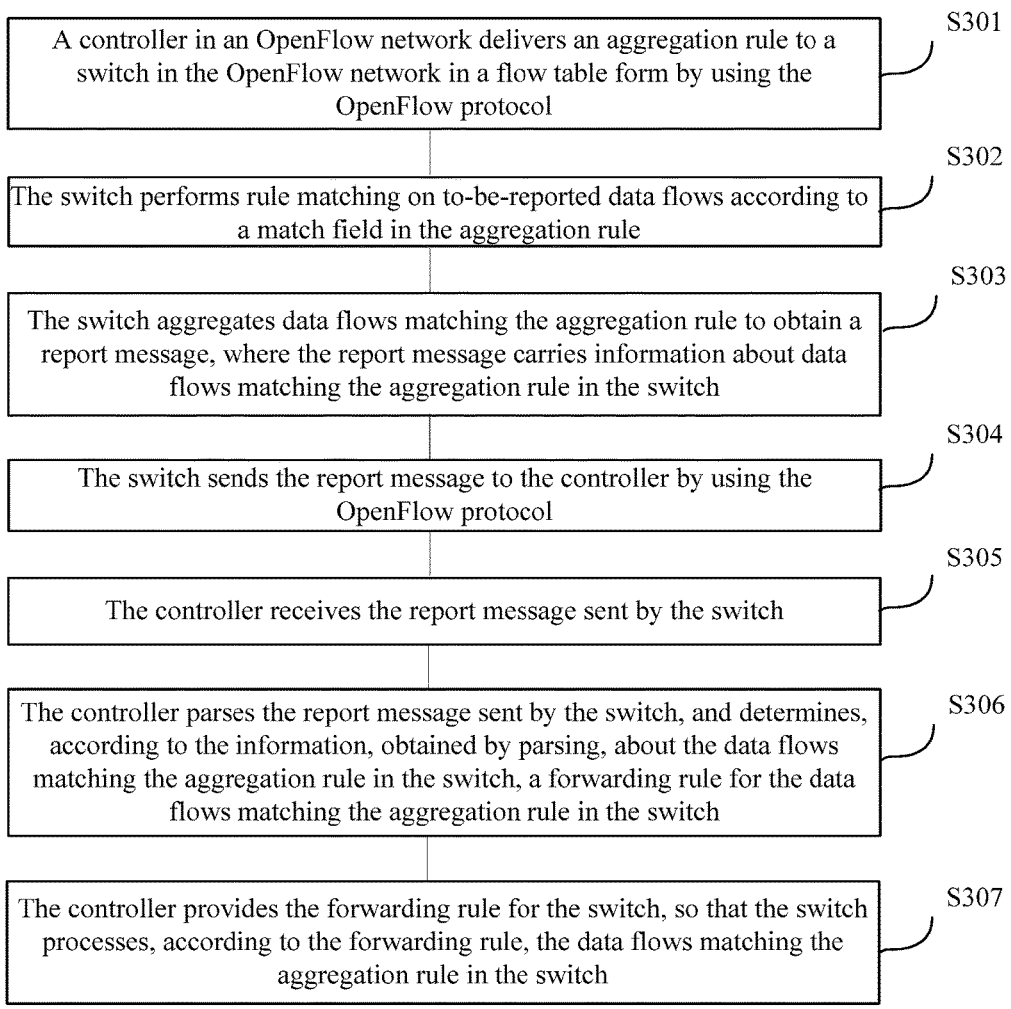
FIG. 3 is a flowchart of still another data processing method for an OpenFlow network according to an embodiment of the present disclosure.

Embodiments of the present disclosure provide a data processing method and apparatus for an OpenFlow network, which can reduce impact of a large quantity of to-be-reported data flows in the OpenFlow network on control channel bandwidth resources and control channel efficiency, and improve utilization of the control channel bandwidth resources.

An existing OpenFlow network model includes two key parts: a controller and a switch, where the switch may be configured to forward a data packet from a client such as a host, a personal computer (PC), and a notebook computer, and the controller may determine a forwarding rule used by the switch to forward the data packet. In the OpenFlow network, generally there are multiple switches, and the switches have respective flow tables used to indicate a forwarding rule. After a switch receives a data packet, the switch matches the data packet with a flow table, used to indicate the forwarding rule, of the switch. If a suitable flow entry can be matched in the flow table, a corresponding instruction and action (that is, the forwarding rule) provided by the flow entry are executed, for example, directly forwarding the data packet to a port, forwarding the data packet to a port after modifying the data packet, or discarding the data packet. If no suitable flow entry is matched in the flow table, the unmatched data packet (for ease of description, a data packet that does not match a forwarding rule is hereinafter referred to as a to-be-reported data flow) is reported to a controller using a Packet_In message of the OpenFlow protocol through a Transmission Control Protocol (TCP) control channel established to the controller, and the controller determines a forwarding rule for the unmatched data packet. When the switch has multiple to-be-reported data flows, the switch may further store the to-be-reported data flows in a buffer of the switch.

However, when there are a large quantity of switches in the network and a large quantity of switches need to report to-be-reported data flows to the controller, or when a switch has a large quantity of to-be-reported data flows, a large quantity of Packet_In messages are generated and reported to the controller, and the large quantity of Packet_In messages bring about relatively great pressure to the control channel, occupy a large quantity of control channel bandwidth resources, and reduce control efficiency of the control channel.

To resolve this problem, an embodiment of the present disclosure provides a data processing method for an OpenFlow network, so that a switch in the OpenFlow network can acquire an aggregation rule provided by a controller in the OpenFlow network, perform rule matching on to-be-reported data flows (that is, data packets that do not match a forwarding rule) according to the aggregation rule, aggregate data flows matching the aggregation rule to obtain a report message, and send the report message to the controller using the OpenFlow protocol. This method avoids that each to-be-reported data flow is sent to the controller using a Packet_In message, reduces control channel bandwidth resources consumed by the Packet_In message, reduces impact of a large quantity of to-be-reported data flows in the OpenFlow network on the control channel bandwidth resources and control channel efficiency, and improves utilization of the control channel bandwidth resources.

The following describes the embodiments of the present disclosure in detail.

Embodiment 1

An embodiment of the present disclosure provides a data processing method for an OpenFlow network. The method may include the following steps.

S101. A switch in the OpenFlow network acquires an aggregation rule provided by a controller in the OpenFlow network.

The controller in the OpenFlow network may preset a rule, such as an aggregation rule, which is used to instruct the switch to classify to-be-reported data flows according to the rule, so that the switch in the OpenFlow network can aggregate to-be-reported data flows matching the rule to obtain a report message, and then report the report message to the controller, thereby improving utilization of control channel resources in the OpenFlow network.

In addition, the aggregation rule may include a match field. Rule matching is performed on the to-be-reported data flows using the match field in the aggregation rule. To-be-reported data flows matching the match field have some identical features. The controller may determine a forwarding rule for data flows conforming to the match field, packetize information about the data flows conforming to the match field, and report the information to the controller. Therefore, this method only improves resource utilization of a control channel, but also improves control efficiency of the control channel.

S102. The switch performs rule matching on to-be-reported data flows according to the aggregation rule.

The aggregation rule may exist in the switch in a flow table form, and the switch also stores a flow table used to indicate a data packet forwarding rule. After a switch receives a data packet, the switch matches the data packet with a flow table of the switch, where the flow table is used to indicate a data packet forwarding rule. If no suitable flow entry (that is, the data packet is a to-be-reported data flow) is matched in the flow table used to indicate the data packet forwarding rule, the switch may further match the data packet with a flow table used to indicate an aggregation rule, that is, perform rule matching on the to-be-reported data flow. If the to-be-reported data flow matches the aggregation rule, the switch may store the data flow matching the aggregation rule in a buffer of the switch, so that the switch can subsequently process and report the data flow matching the aggregation rule.

S103. The switch aggregates data flows matching the aggregation rule to obtain a report message.

The switch may aggregate, according to a preset policy, the data flows that match the aggregation rule and are temporarily stored in the switch. For example, when a quantity of the data flows matching the aggregation rule in the switch reaches a preset threshold, the switch aggregates the data flows matching the aggregation rule. For another example, the switch periodically aggregates, according to a preset time period, the data flows matching the aggregation rule.

The switch may aggregate the data flows matching the aggregation rule in multiple manners, which may be extracting match information of the data flows matching the aggregation rule, that is, common information. For example, if the switch matches the to-be-reported data flows using a match field in the aggregation rule, the extracting the common information about the data flows matching the aggregation rule may be extracting a type of the match field, an identifier of the match field, a length of the match field, and mask information of the match field in the aggregation rule, and extracting the match value of the data flows that matches the aggregation rule; or may be extracting digest data or all data of the data flows matching the aggregation rule. Correspondingly, the report message may carry the match information, or may carry the digest data or all the data of the data flows matching the aggregation rule, so that the controller can subsequently determine, according to the report message, a forwarding rule for the data flows matching the aggregation rule.

In addition, the switch may further acquire more information and add the information to the report message, for example, acquiring a storage address (such as a sequence number in a buffer of the switch) of the data flows matching the aggregation rule in the switch, or an identifier of a flow table in which the aggregation rule exists in the switch.

S104. The switch sends the report message to the controller using the OpenFlow protocol, so that the controller determines, according to the report message, a forwarding rule for the data flows matching the aggregation rule in the switch.

In this embodiment of the present disclosure, a switch may perform rule matching on to-be-reported data flows according to an aggregation rule provided by a controller, aggregate data flows matching the aggregation rule to obtain a report message, and send the report message to the controller using the OpenFlow protocol, so that the controller can determine, according to the report message, a forwarding rule for the data flows matching the aggregation rule. This method avoids that each to-be-reported data flow is reported to the controller using a Packet_In message, reduces impact of a large quantity of to-be-reported data flows in an OpenFlow network on control channel bandwidth resources and control channel efficiency, and improves utilization of the control channel bandwidth resources.

Embodiment 2

An embodiment of the present disclosure provides a data processing method for an OpenFlow network. The method may include the following steps.

S201. A controller in the OpenFlow network provides an aggregation rule for a switch in the OpenFlow network.

In this embodiment of the present disclosure, the aggregation rule is used to classify to-be-reported data flows in the switch, so as to aggregate to-be-reported data flows of a same type to report to the controller, so that the controller can determine a forwarding rule for the to-be-reported data flows of the same type, thereby improving efficiency of a control channel.

The controller may provide the aggregation rule for the switch by modifying a flow table in the switch (including adding a flow entry, modifying a flow entry, deleting a flow entry, and so on), so that the switch can subsequently determine, using the flow table modified by the controller, whether the to-be-reported data flows conform to the aggregation rule.

The OpenFlow protocol supports three message types: controller-to-switch, asynchronous, and symmetric, and each type of message may have multiple sub-types. A controller-to-switch message is initiated by a controller and used to manage or acquire a status of an OpenFlow switch. An asynchronous message is initiated by an OpenFlow switch and used to update a network event or a switch status change to the controller. In this embodiment of the present disclosure, the controller may modify the flow table in the switch using an OFPT_FLOW_MOD message in the controller-to-switch message, where the modifying the flow table includes such types as adding a flow entry, modifying a flow entry, and deleting a flow entry. For example, a message type may be set to ADD to add a flow entry to the flow table in the switch, so that the added flow entry in the switch is the aggregation rule delivered by the controller.

S202. The controller receives a report message sent by the switch, where the report message carries information about data flows matching the aggregation rule in the switch.

The information, carried in the report message, about the data flows matching the aggregation rule in the switch may be common information about the data flows matching the aggregation rule in the switch. For example, the switch may match to-be-reported data flows using a match field in the aggregation rule, and the common information about the data flows matching the aggregation rule in the switch may be a type of the match field, an identifier of the match field, a length of the match field, mask information of the match field in the aggregation rule, and a match value of the data flows that matches the aggregation rule. The information, carried in the report message, about the data flows matching the aggregation rule in the switch may also be digest data or all data of the data flows matching the aggregation rule in the switch. Therefore, the controller can determine, according to the information, carried in the report message, about the data flows matching the aggregation rule in the switch, a forwarding rule for the data flows matching the aggregation rule in the switch.

S203. The controller determines, according to the report message, a forwarding rule for the data flows matching the aggregation rule in the switch.

The controller may parse the report message to obtain the information about the data flows matching the aggregation rule in the switch, and determine, according to the information about the data flows matching the aggregation rule in the switch, the forwarding rule for the data flows matching the aggregation rule in the switch.

S204. The controller provides the forwarding rule for the switch, so that the switch processes, according to the forwarding rule, the data flows matching the aggregation rule in the switch.

The controller may provide the forwarding rule for the switch by modifying a flow table in the switch (including adding a flow entry, modifying a flow entry, deleting a flow entry, and so on). For example, the controller provides the forwarding rule for the switch by delivering one or more flow table entries. For another example, the controller modifies, according to an identifier of a flow table in which the aggregation rule exists in the switch, the flow table in which the aggregation rule exists in the switch, so as to provide the forwarding rule for the switch. In this way, the switch can process, according to the forwarding rule, the data flows that match the aggregation rule and are temporarily stored in the switch, or can process data flows matching the aggregation rule that are subsequently received in the switch.

In this embodiment of the present disclosure, a controller may provide an aggregation rule for a switch, and receive a report message sent by the switch, where the report message carries information about data flows matching the aggregation rule in the switch, so that the controller can determine, according to the report message, a forwarding rule for the data flows matching the aggregation rule in the switch, and provide the forwarding rule for the switch. This method avoids that the switch can obtain the forwarding rule only after reporting each to-be-reported data flow to the controller using a Packet_In message, reduces impact of a large quantity of to-be-reported data flows in an OpenFlow network on control channel bandwidth resources and control channel efficiency, and improves utilization of the control channel bandwidth resources.

In Embodiment 1 or Embodiment 2 of the present disclosure, a controller in the OpenFlow network or a switch in the OpenFlow network may perform interaction and process data in the OpenFlow network according to Embodiment 3 of the present disclosure.

Embodiment 3

An embodiment of the present disclosure provides a data processing method for an OpenFlow network. The method includes the following steps.

S301. A controller in the OpenFlow network delivers, in a flow table form, an aggregation rule to a switch in the OpenFlow network using the OpenFlow protocol.

The controller may deliver the aggregation rule to the switch in a flow table form, where the aggregation rule may include a match field, so as to achieve a purpose of classifying to-be-reported data flows, so that the switch can perform rule matching on the to-be-reported data flows according to the match field in the aggregation rule.

The OpenFlow protocol specifies multiple feature fields used for flow matching, such as ETH_Type (Ethernet type), ETH_DST (destination MAC address), IP_PROTO (internet protocol (IP) type), IP_SRC (source IP address), IP_DST (destination IP address), TCP_DST (destination TCP port number), and UDP_DST (destination user datagram protocol (UDP) port number). The controller may select one or more of the feature fields used for flow matching that are specified in the OpenFlow protocol (including those specified in the launched OpenFlow protocol versions and those specified in the OpenFlow protocol versions to be updated subsequently) to serve as the match field or match fields in the aggregation rule, so that the switch can perform the rule matching on the to-be-reported data flows according to the match field or match fields in the aggregation rule, to achieve a purpose of classifying and aggregating the to-be-reported data flows.

For example, Table 1 shows the aggregation rule existing in the switch in a flow table form, where the flow table entry may exist in the last flow table in the switch.

TABLE 1

| Table_last (Flow table) | | | | | | | |
|---|---|---|---|---|---|---|---|
| Match field | | | | | Priority | Instruction | Action |
| ETH_Type | ETH_DST | ...... | IP_DST | UDP_DST | Priority | Instr | Action |
| 0x0800 | * | ...... | 10.0.0.0 Mask: 0xFFFF0000 | * | 0 | Write instruction | Send to controller |

The match fields in the aggregation rule shown in Table 1 include the ETH_Type and the IP_DST, and the meaning of the aggregation rule is to match all data packets whose Ethernet type is IPv4 (OFPXMT_OFB_ETH_TYPE=0x0800, or ETH_TYPE=0x0800), and whose destination IP address falls within a range between 10.0.0.0 and 10.0.255.255. The action of a flow entry indicates that a successfully matched data packet is output to a logical port of the controller, that is, reported to the controller. The priority "0" of a flow entry indicates that a priority of a flow table corresponding to the aggregation rule is set to the lowest, which means that after receiving the data packet, the switch first matches the data packet with a flow table used to indicate a data packet forwarding rule, and if not matched, the switch matches the data packet that does not match a forwarding rule (that is, a to-be-reported data flow) with a flow table used to indicate the aggregation rule. Certainly, in another embodiment, another priority may be set.

For another example, an aggregation rule delivered by the controller to the switch may be shown in Table 2.

TABLE 2

| Table_last (Flow table) | | | | | | | |
|---|---|---|---|---|---|---|---|
| Match field | | | | | Priority | Instruction | Action |
| ETH_Type | ETH_DST | ...... | TCP_Dst | UDP_DST | Priority | Instr | Action |
| 0x0800 | * | ...... | * | 67 | 0 | Write instruction | Send to controller |

The match fields in the aggregation rule shown in Table 2 include an ETH_Type and a UDP_DST, and the meaning of the aggregation rule is to match all data packets whose Ethernet type is Internet Protocol version 4 (IPv4) (Eth_type=0x0800), and whose destination UDP port number is 67.

In the flow table illustrated in Table 1 or Table 2, the aggregation rule corresponds to one flow entry of the flow table. In another optional embodiment, the aggregation rule may also include multiple flow entries, and have multiple match rules, that is, the to-be-reported data flows in the switch are classified into several types of data flows, and then separately aggregated and reported.

S302. The switch performs rule matching on to-be-reported data flows according to a match field in the aggregation rule.

Because the aggregation rule exists in the switch in a flow table form, the switch may perform the rule matching on the to-be-reported data flows according to the match field in the aggregation rule, that is, the match field in a flow table corresponding to the aggregation rule. For example, when the aggregation rule is an aggregation rule shown in Table 1, the match fields include the Ethernet type and the destination IP address, and to-be-reported data flows meeting that the Ethernet type is IPv4 (Eth_type=0x0800) and the destination IP address falls within a range between 10.0.0.0 and 10.0.255.255 are matched successfully.

S303. The switch aggregates data flows matching the aggregation rule to obtain a report message, where the report message carries information about the data flows matching the aggregation rule in the switch.

The switch may aggregate, according to a preset policy, the data flows matching the aggregation rule in the switch to obtain the report message. For example, when a quantity of the data flows matching the aggregation rule in the switch reaches a preset threshold, the switch aggregates the data flows matching the aggregation rule. For another example, the switch periodically aggregates, according to a preset time period, the data flows matching the aggregation rule.

The switch may aggregate the data flows matching the aggregation rule in multiple manners, which may be generating, by the switch, match information according to the match field in the aggregation rule, where the information, carried in the report message, about the data flows matching the aggregation rule in the switch may be the match information. The match information can reflect features of the match field in the aggregation rule, so that the controller can determine, according to the features of the match field, a forwarding rule for data flows matching the match field. Contents of the match information may include:

(1) Type of the match field in the aggregation rule: Oxm_class, including standard and vendor-defined. For example, as shown in Table 1, the match fields in the aggregation rule are the Ethernet type and the destination IP address, and correspondingly, the type of the match field in the aggregation rule is standard.

(2) Identifier (ID) of the match field in the aggregation rule: Oxm_field. For example, when the aggregation rule is an aggregation rule shown in Table 1, IDs of the match fields in the aggregation rule are an ID of the Ethernet type and an ID of the destination IP address.

(3) Length of the match field in the aggregation rule: Oxm_length. For example, when the aggregation rule is an aggregation rule shown in Table 1, lengths of the match fields in the aggregation rule are that a length of the Ethernet type is 2 bytes and a length of the destination IP address is 4 bytes.

(4) Mask information of the match field in the aggregation rule, which may include whether the match fields in the aggregation rule include a mask (MH) and a quantity of bits of a mask (Oxm_mask). For example, if the aggregation rule is an aggregation rule shown in Table. 1, when the Ethernet type is the match field, because the Ethernet type does not include a mask, the match filed is a specific value. When the destination IP address is the match field, because the IP address includes a mask (0xFFFF0000) and the mask is lower 16 bits in the IP address, the match field is 10.0.*.* (10.0.0.0 to 10.0.255.255), that is, rule matching is not required for the lower 16 bits in the destination IP address.

(5) A match value of the data flows that matches the aggregation rule: oxm_value. For example, if the aggregation rule is an aggregation rule shown in Table 1, when the data flows matching the aggregation rule are <Ethernet type 0x0800, destination IP address 10.0.250.255> and <Ethernet type 0x0800, destination IP address 10.0.150.255>, the match value of the data flows that matches the aggregation rule may be <0x0800, 10.0.0.0-10.0.255.255>, that is, the match value may be values of the match fields in the aggregation rule. The match value of the data flows that matches the aggregation rule may be <0x0800, 10.0.0.0-10.0.150.255>, <10.0.0.0-10.0.250.255>, that is, the match value may be a specific value of the data flows matching the aggregation rule. The match value of the data flows that matches the aggregation rule may be a value range that covers the data flows matching the aggregation rule and the specific value matching the aggregation rule, where the value range belongs to a value of the match field in the aggregation rule, such as <0x0800, 10.0.0.0-10.0.150.255 to 10.0.0.0-10.0.250.255> or <0x0800, 10.0.0.0-10.0.050.255 to 10.0.0.0-10.0.250.255>.

For example, the aggregation rule shown in Table 1 is used as an example, a structure of a generated match field in the aggregation rule may include contents shown in Table 3:

TABLE 3

| oxm_class | oxm_field | MH | oxm_length | oxm_value | oxm_mask |
|---|---|---|---|---|---|
| Standard | Ethernet ID | 0 | 2 bytes | 0x0800 | None |
| Standard | ID of destination IP address | 1 | 4 bytes | 10.0.0.0-10.0.255.255 | 16 bits |

MH=0 indicates that the match field does not include a mask, and MH=1 indicates that the match field include a mask.

Subsequently, the controller can obtain, by parsing the match information shown in Table 3, that the match fields in the aggregation rule are the Ethernet type and the destination IP address. An Ethernet type of the data flows matching the aggregation rule is IPv4 (Eth_type=0x0800), the destination IP falls within a range between 10.0.0.0 and 10.0.255.255, and during rule matching, rule matching is not required for lower 16 bits of the destination IP address, that is, if the destination IP address is 10.0.*.*, and Ethernet type is 0x0800, the matching can succeed.

Optionally, that the switch aggregates the data flows matching the aggregation rule may further include acquiring, by the switch, data information, where the data information is digest data or all data of the data flows matching the aggregation rule in the switch. The data flows matching the aggregation rule are actually a data packet. The switch may acquire all contents (that is, all data) of the data packet, or may acquire key contents or a part of contents (that is, digest data) of the data packet. Then, the information, carried by the report message, about the data flows matching the aggregation rule in the switch may further be the data information and the match information, so that the controller can refer to the digest data or all the data of the data flows of this type when subsequently determining a forwarding rule for the data flows of this type.

Optionally, that the switch aggregates the data flows matching the aggregation rule may further include acquiring, by the switch, a storage address of the data flows matching the aggregation rule in the switch, such as a sequence number (buffer ID) of the data flows matching the aggregation rule in a buffer of the switch. The report message may further carry the storage address of the data flows matching the aggregation rule in the switch, so that the temporarily stored data flows matching the aggregation rule can be found in the switch according to the storage address.

Optionally, that the switch aggregates the data flows matching the aggregation rule may further include determining, by the switch, an identifier of a flow table in which the aggregation rule exists in the switch, such as a table ID, so that the aggregation rule can be found in the switch according to the identifier of the flow table in which the aggregation rule exists in the switch. The report message may further carry the identifier of the flow table in which the aggregation rule exists in the switch, so that the controller can subsequently modify an action in the flow table corresponding to the ID to achieve a purpose of delivering a forwarding decision.

Optionally, that the switch aggregates the data flows matching the aggregation rule may further include generating, by the switch, a report cause of the data flows matching the aggregation rule, for example, the report cause may be that no flow table of the switch is matched. The report message may further carry the report cause of the data flows matching the aggregation rule, so that the controller can acquire more information.

S304. The switch sends the report message to the controller using the OpenFlow protocol.

The report message may carry at least one of the following the match information, the data information, the storage address of the data flows matching the aggregation rule, the identifier of the flow table in which the aggregation rule exists in the switch, the report cause of the data flows matching the aggregation rule, and the forwarding rule, determined by the controller according to the report message, for the data flows matching the aggregation rule in the switch.

In the OpenFlow network, the OpenFlow protocol specifies a Packet_In message format, and the switch may send the to-be-reported data flows to the controller in the Packet_In message format.

In this embodiment of the present disclosure, the Packet_In message format may be extended, so that aggregated content can be reported to the switch in the extended Packet_In message format. The extended Packet_In message format may be shown as follows:

```
struct ofp_packet_in{
    struct ofp_header header;/*a message header*/
    uint8_t buffer_num; uint32_t buffer_id[buffer_num]; /*a quantity
of the data flows matching the aggregation rule and a storage address*/
    uint16_t total_len;
    uint8_t reason[buffer_num];/*a report cause of the data flows
matching the aggregation rule*/
    uint8_t table_id[buffer_num]; /*an identifier of the flow table in
which the aggregation rule exists in the switch*/
    uint64_t cookie;
    struct ofp_match match; /*match information*/
    uint8_t data[buffer_num] [0]; /*data information*/
}
```

The foregoing embodiment is only an optional implementation manner. Certainly, in another optional embodiment, another message format or another extended Packet_In message format of the OpenFlow protocol may be used to report the aggregated content to the controller, which is not limited by this embodiment of the present disclosure.

S305. The controller receives the report message sent by the switch.

S306. The controller parses the report message sent by the switch, and determines, according to the information, obtained by parsing, about the data flows matching the aggregation rule in the switch, a forwarding rule for the data flows matching the aggregation rule in the switch.

The information about the data flows matching the aggregation rule in the switch may be the match information (that is, common information about the data flows matching the aggregation rule in the switch), including a type of the match field, an identifier of the match field, a length of the match field, mask information of the match field in the aggregation rule, and a match value of the data flows that matches the aggregation rule. Then, the controller may determine, according to the match information (that is, the common information), the forwarding rule for the data flows matching the aggregation rule in the switch. Because the switch can report the data flows matching the aggregation rule together, the controller can determine, according to the common information about the data flows matching the aggregation rule, the forwarding rule for the data flows matching the aggregation rule in the switch, which not only improves resource utilization of a control channel, but also improves control efficiency of the control channel.

The information about the data flows matching the aggregation rule in the switch may further include the data information, that is, the digest data or all the data of the data flows matching the aggregation rule in the switch. Then, the controller not only can determine the forwarding rule according to the match information (that is, the common information), but also can determine, according to the data information and more information, the forwarding rule for the data flows matching the aggregation rule in the switch.

It should be noted that, the controller may enable all the data flows matching the aggregation rule in the switch to conform to a same forwarding rule, and may also enable the data flow matching the aggregation rule in the switch to conform to different forwarding rules, which are not limited by this embodiment of the preset disclosure.

S307. The controller provides the forwarding rule for the switch, so that the switch processes, according to the forwarding rule, the data flows matching the aggregation rule in the switch.

The controller may send the forwarding rule to the switch, so that the switch processes, according to the forwarding rule, data flows matching the aggregation rule that are subsequently received in the switch. Further, the report message may further carry a storage address, in the switch, of the data flows matching the aggregation rule in the switch, so that the controller can send both the forwarding rule and the storage address to the switch, and the switch can process, according to the forwarding rule, the data flows that match the aggregation rule and are temporarily stored in the storage address.

The controller may deliver the forwarding rule to the switch by delivering one or more flow table entries. For example, the controller delivers the forwarding rule to the switch by delivering one or more new flow tables. For another example, the report message further carries the identifier of the flow table in which the aggregation rule exists in the switch. The controller may modify, according to the identifier of the flow table in which the aggregation rule exists in the switch, the flow table in which the aggregation rule exists in the switch, so as to provide the forwarding rule for the switch.

In this embodiment of the present disclosure, a switch may perform rule matching on to-be-reported data flows according to an aggregation rule provided by a controller, aggregate data flows matching the aggregation rule to obtain a report massage, and send the report message to the controller using the OpenFlow protocol, so that the controller can determine, according to the report message, a forwarding rule for the data flows matching the aggregation rule and provide the forwarding rule for the switch. This method avoids that the switch can obtain the forwarding rule only after reporting each to-be-reported data flow to the controller using a Packet_In message, reduces impact of a large quantity of to-be-reported data flows in an OpenFlow network on control channel bandwidth resources and control channel efficiency, and improves utilization of the control channel bandwidth resources.

Embodiment 4

Figure 4:
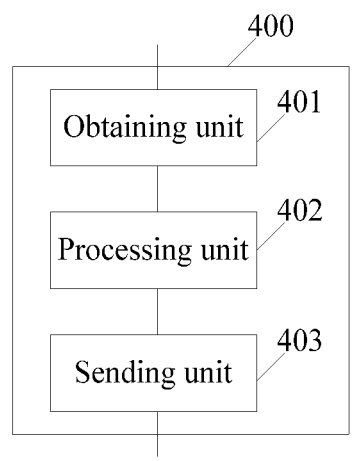
FIG. 4 is a schematic diagram of a switch for an OpenFlow network according to an embodiment of the present disclosure.

An embodiment of the present disclosure provides a switch for an OpenFlow network. As shown in FIG. 4, the switch 400 may include an acquiring unit 401, a processing unit 402, and a sending unit 403.

The acquiring unit 401 is configured to acquire an aggregation rule provided by a controller in the OpenFlow network.

The processing unit 402 is configured to perform rule matching on to-be-reported data flows in the switch according to the aggregation rule, and aggregate data flows matching the aggregation rule to obtain a report message.

The sending unit 403 is configured to send the report message to the controller using the OpenFlow protocol, so that the controller determines, according to the report message, a forwarding rule for the data flows matching the aggregation rule in the switch.

The controller in the OpenFlow network may preset a rule, such as an aggregation rule, which is used to instruct the switch to classify the to-be-reported data flows in the switch according to the rule, so as to aggregate data flows matching the rule to obtain a report message, and report the report message to the controller, thereby improving utilization of control channel resources in the OpenFlow network.

The acquiring unit 401 may acquire the aggregation rule provided by the controller, where the aggregation rule may include a match field. The processing unit 402 may perform the rule matching on the to-be-reported data flows in the switch using the match field in the aggregation rule, and aggregate the data flows matching the aggregation rule to obtain the report message; and may aggregate the data flows matching the aggregation rule according to a preset policy. For example, when a quantity of the data flows matching the aggregation rule reaches a preset threshold, the processing unit 402 aggregates the data flows matching the aggregation rule; and for another example, the processing unit 402 periodically aggregates, according to a preset time period, the data flows matching the aggregation rule.

The processing unit 402 may aggregate the data flows matching the aggregation rule in multiple manners, which may be extracting match information of the data flows matching the aggregation rule, that is, common information. For example, if the processing unit 402 matches the to-be-reported data flows using the match field in the aggregation rule, the extracting the common information about the data flows matching the aggregation rule may be extracting a type of the match field, an identifier of the match field, a length of the match field, and mask information of the match field in the aggregation rule, and extracting the a match value of the data flows that matches the aggregation rule; or may be extracting digest data or all data of the data flows matching the aggregation rule. Correspondingly, the report message may carry the match information, or may carry the digest data or all the data of the data flows matching the aggregation rule, so that the controller can subsequently determine, according to the report message, the forwarding rule for the data flows matching the aggregation rule. In addition, the processing unit 402 may further aggregate the data flows matching the aggregation rule to obtain more information and add the information to the report message, for example, acquire a storage address (such as a sequence number in a buffer of the switch), in the switch, of the data flows matching the aggregation rule, or an identifier of a flow table in which the aggregation rule exists in the switch.

The sending unit 403 may send the report message to the controller using the OpenFlow protocol, for example, extend a Packet_in message format of the OpenFlow protocol, and send the report message to the controller in the extended Packet_in message format, so that the controller determines, according to the report message, the forwarding rule for the data flows matching the aggregation rule in the switch. For a specific implementation manner of extending the Packet_in message format of the OpenFlow protocol, refer to Embodiment 3, and details are not repeated herein.

In this embodiment of the present disclosure, the acquiring unit 401 may acquire an aggregation rule provided by a controller; the processing unit 402 may perform rule matching on to-be-reported data flows in a switch according to the aggregation rule, and aggregate data flows matching the aggregation rule to obtain a report message; and the sending unit 403 may send the report message to the controller, so that the controller can determine, according to the report message, a forwarding rule for the data flows matching the aggregation rule. This switch avoids that each to-be-reported data flow is reported to the controller using a Packet_in message, reduces impact of a large quantity of to-be-reported data flows in an OpenFlow network on control channel bandwidth resources and control channel efficiency, and improves utilization of the control channel bandwidth resources.

The switch for an OpenFlow network provided by this embodiment of the present disclosure can execute a method procedure of the data processing method for an OpenFlow network described in Embodiment 1 or Embodiment 3, and details are not repeated in this embodiment of the present disclosure.

Embodiment 5

Figure 5:
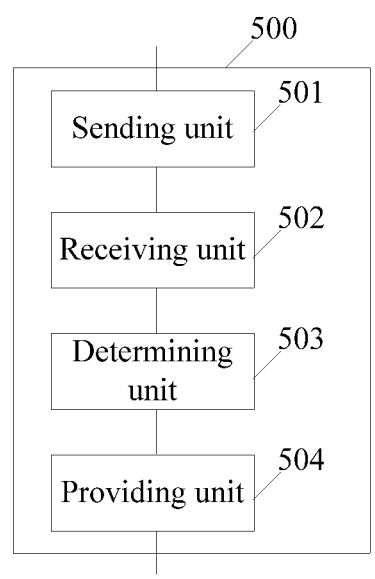
FIG. 5 is a schematic diagram of a controller for an OpenFlow network according to an embodiment of the present disclosure.

An embodiment of the present disclosure provides a controller for an OpenFlow network. As shown in FIG. 5, the controller 500 may include a sending unit 501, a receiving unit 502, a determining unit 503, and a providing unit 504.

The sending unit 501 is configured to provide an aggregation rule for a switch in the OpenFlow network.

The receiving unit 502 is configured to receive a report message sent by the switch, where the report message carries information about data flows matching the aggregation rule in the switch.

The determining unit 503 is configured to determine, according to the report message, a forwarding rule for the data flows matching the aggregation rule in the switch.

The providing unit 504 is configured to provide the forwarding rule for the switch, so that the switch processes, according to the forwarding rule, the data flows matching the aggregation rule in the switch.

The sending unit 501 may provide the forwarding rule for the switch by modifying a flow table in the switch (including adding a flow entry, modifying a flow entry, deleting a flow entry, and so on), so that the switch can subsequently determine, using the modified flow table, whether to-be-reported data flows conform to the aggregation rule.

The information, carried by the report message received by the receiving unit 502, of the data flows matching aggregation rule in the switch may be match information, where the match information includes a type of a match field, an identifier of the match field, a length of the match field, mask information of the match field in the aggregation rule, and a match value of the data flows that matches the aggregation rule. The determining unit 503 may parse the report message to obtain the match information, and determine, according to the match information, the forwarding rule for the data flows matching the aggregation rule in the switch.

The information, carried by the report message received by the receiving unit 502, about the data flows matching the aggregation rule in the switch may further be data information and the match information, where the data information is digest data or all data of the data flows matching the aggregation rule in the switch. The determining unit 503 may parse the report message to obtain the data information and the match information, and determine, according to the data information and the match information, the forwarding rule for the data flows matching the aggregation rule in the switch.

The providing unit 504 may send the forwarding rule to the switch, so that the switch processes, according to the forwarding rule, data flows matching the aggregation rule that are subsequently received in the switch. Further, the report message may further carry a storage address, in the switch, of the data flows matching the aggregation rule in the switch, so that the providing unit 504 can send both the forwarding rule and the storage address to the switch, and the switch can process, according to the forwarding rule, the data flows that match the aggregation rule and are temporarily stored in the storage address. The providing unit 504 may deliver the forwarding rule to the switch by delivering one or more flow table entries. For example, the providing unit 504 delivers the forwarding rule to the switch by delivering one or more flow table entries. For another example, the report message further carries an identifier of a flow table in which the aggregation rule exists in the switch (such as a table ID), and the providing unit 504 may modify, according to the identifier of the flow table in which the aggregation rule exists in the switch, the flow table in which the aggregation rule exists in the switch, so as to provide the forwarding rule for the switch.

In this embodiment of the present disclosure, a sending unit 501 may provide an aggregation rule for a switch; a receiving unit 502 may receive a report message sent by the switch, where the report message carries information about data flows matching the aggregation rule in the switch, so that a determining unit 503 determines, according to the report message, a forwarding rule for the data flows matching the aggregation rule in the switch; and the providing unit 504 can provide the forwarding rule for the switch, so that the switch processes, according to the forwarding rule, the data flows matching the aggregation rule in the switch. This controller avoids that the switch can obtain the forwarding rule only after reporting each to-be-reported data flow using a Packet_In message, reduces impact of a large quantity of to-be-reported data flows in an OpenFlow network on control channel bandwidth resources and control channel efficiency, and improves utilization of the control channel bandwidth resources.

The controller for an OpenFlow network provided by the embodiment of the present disclosure can execute a method procedure of the data processing method for an OpenFlow network described in Embodiment 2 or Embodiment 3, and details are not repeated in this embodiment of the present disclosure.

Embodiment 6

Figure 6:
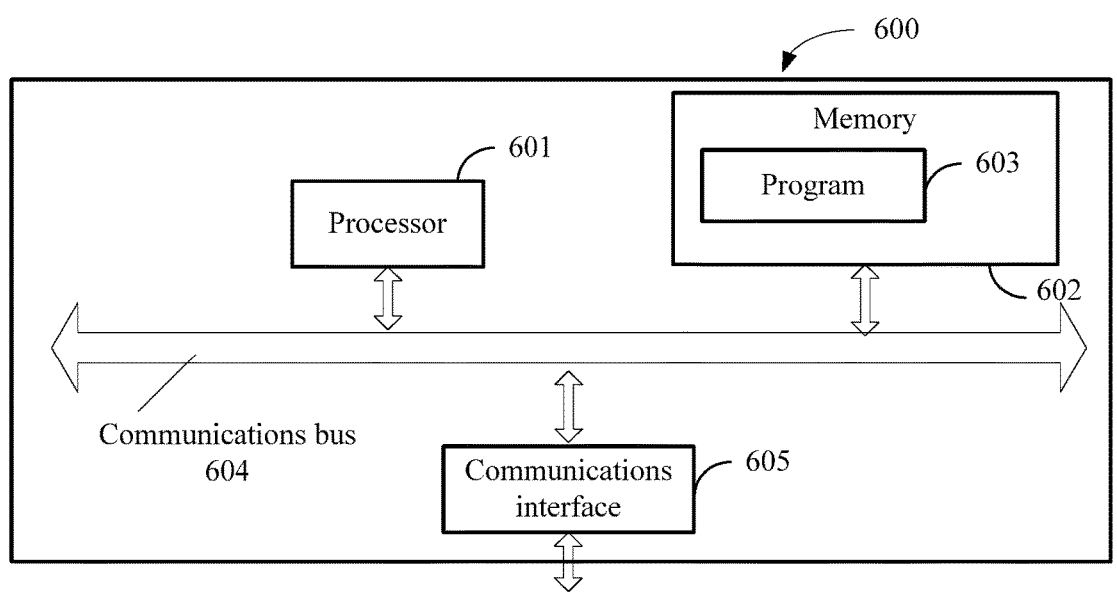
FIG. 6 is schematic structural diagram of a data processing apparatus for an OpenFlow network according to an embodiment of the present disclosure.

FIG. 6 is a data processing apparatus for an OpenFlow network according to an embodiment of the present disclosure. The data processing apparatus 600 may include a processor 601, a memory 602, a system bus 604, and a communications interface 605. The processor 601, the memory 602, and the communications interface 605 are connected using the system bus 604 and implement mutual communication.

The processor 601 may be a single-core or multi-core central processing unit, or an application-specific integrated circuit, or one or more integrated circuits configured to implement this embodiment of the present disclosure.

The memory 602 may be a high-speed random access memory (RAM), and may also be a non-volatile memory, such as at least one magnetic disk storage.

The memory 602 is configured to store a computer-executable instruction 603. The computer-executable instruction 603 may include program code.

When the apparatus runs, the processor 601 executes the computer-executable instruction 603, and a method procedure of the data processing method for an OpenFlow network described in any one of Embodiment 1 to Embodiment 3 can be executed. When executing the method procedure of the data processing method for an OpenFlow network according to Embodiment 1 or Embodiment 3, the data processing apparatus may be a switch in the OpenFlow network. When executing the method procedure of the data processing method for an OpenFlow network according to Embodiment 2 or Embodiment 3, the data processing apparatus may be a controller in the OpenFlow network.

This embodiment of the present disclosure provides a computer-readable medium, including a computer-executable instruction, so that when a processor of a computer executes the computer-executable instruction, the computer executes the method procedure of the data processing method for an OpenFlow network according to Embodiment 1 or Embodiment 3.

This embodiment of the present disclosure further provides a computer-readable medium, including a computer-executable instruction, so that when a processor of a computer executes the computer-executable instruction, the computer executes the method procedure of the data processing method for an OpenFlow network according to Embodiment 2 or Embodiment 3.

A person of ordinary skill in the art may understand that, each aspect of the present disclosure or a possible implementation manner of each aspect may be implemented as a system, a method, or a computer program product. Therefore, each aspect of the present disclosure or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present disclosure or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a RAM, a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

What is claimed is:

1. A data processing method for an OpenFlow network, comprising:
acquiring, by a switch in the OpenFlow network, an aggregation rule provided by a controller in the Open- Flow network, the aggregation rule including a match field which comprises one or more parameters for determining whether a data flow is matched with the aggregation rule;

aggregating, by the switch, data flows matching the aggregation rule to obtain a report message in a data packet, the report message carrying match information of the data flows, and the match information being generated according to the match field and comprising: a type of the match field, an identifier of the match field, a length of the match field, mask information of the match field, and a match value of the data flows that matches the aggregation rule;

sending, by the switch, the report message to the controller for the controller to determine a forwarding rule for the data flows; and processing, by the switch, the data flows according to the forwarding rule provided by the controller according to the report.

2. The method according to claim 1, wherein the report message further comprises digest data of the data flows or the data flows.

3. The method according to claim 1, wherein the report message further comprises a storage address of the data flows buffered in the switch.

4. The method according to claim 1, wherein the report message further comprises an identifier of a flow table in which the aggregation rule exists in the switch.

5. The method according to claim 1, wherein aggregating the data flows matching the aggregation rule to obtain the report message in the data packet is performed when a quantity of the data flows matching the aggregation rule reaches a preset threshold, or wherein aggregating the data flows matching the aggregation rule to obtain the report message in the data packet is performed periodically according to a preset time period.

6. The method according to claim 1, wherein the report message is sent to the controller in a Packet_in message format of an OpenFlow protocol.

7. A data processing method for an OpenFlow network, comprising:

acquiring, by a switch in the OpenFlow network, an aggregation rule provided by a controller in the OpenFlow network, the aggregation rule including a match field which comprises one or more parameters for determining whether a data flow is matched with the aggregation rule;

aggregating, by the switch, data flows matching the aggregation rule to obtain a report message in a data packet, the report message carrying match information of the data flows, and the match information being generated according to the match field and comprising: a type of the match field, an identifier of the match field, a length of the match field, mask information of the match field, and a match value of the data flows that matches the aggregation rule;

sending, by the switch, the report message to the controller;

providing, by the controller according to the report message, a forwarding rule for the data flows for the switch; and processing, by the switch, the data flows according to the forwarding rule.

8. The method according to claim 7, wherein the report message is sent to the controller in a Packet_in message format of an OpenFlow protocol.

9. The method according to claim 7, wherein aggregating the data flows matching the aggregation rule to obtain the report message in the data packet is performed when a quantity of the data flows matching the aggregation rule reaches a preset threshold, or wherein aggregating the data flows matching the aggregation rule to obtain the report message in the data packet is performed periodically according to a preset time period.

10. The method according to claim 7, wherein the report message further comprises a data information, the data information being digest data of the data flows or all data of the data flows, and providing the forwarding rule for the data flows being performed by the controller according to the data information and the match information.

11. The method according to claim 7, wherein the report message further comprises a storage address of the data flows buffered in the switch, the forwarding rule and the storage address being provided, by the controller, to the switch, and the data flows buffered in the switch being processed by the switch according to the forwarding rule and the storage address.

12. The method according to claim 7, wherein the report message further comprises an identifier of a flow table in which the aggregation rule exists in the switch.

13. An OpenFlow network comprising:
a controller; and
a switch coupled to the controller and configured to:
acquire an aggregation rule provided by the controller in the OpenFlow network, the aggregation rule including a match field which comprises one or more parameters for determining whether a data flow is matched with the aggregation rule;
aggregate data flows matching the aggregation rule to obtain a report message in a data packet, the report message carrying match information of the data flows, and the match information being generated according to the match field and comprises: a type of the match field, an identifier of the match field, a length of the match field, mask information of the match field, and a match value of the data flows that matches the aggregation rule; and
send the report message to the controller,
the controller being configured to provide, according to the match information in the report message, a forwarding rule for the data flows for the switch, and
the switch being further configured to process, according to the forwarding rule, the data flows.

14. The OpenFlow network according to claim 13, wherein the report message is sent to the controller in a Packet_in message format of an OpenFlow protocol.

15. The OpenFlow network according to claim 13, wherein aggregating the data flows matching the aggregation rule to obtain the report message in the data packet is performed when a quantity of the data flows matching the aggregation rule reaches a preset threshold, or wherein aggregating the data flows matching the aggregation rule to obtain the report message in the data packet is performed periodically according to a preset time period.

16. The OpenFlow network according to claim 13, wherein the report message further comprises a data information, the data information being digest data of the data flows or the data flows, and providing the forwarding rule for the data flows comprising providing, according to the data information and the match information, the forwarding rule for the data flows for the switch.

17. The OpenFlow network according to claim 13, wherein the report message further comprises a storage address of the data flows buffered in the switch, providing the forwarding rule for the switch comprising sending the forwarding rule and the storage address to the switch, and processing the data flows comprising processing, according to the forwarding rule and the storage address, the data flows buffered in the switch.

18. The OpenFlow network according to claim 13, wherein the report message further comprises an identifier of a flow table in which the aggregation rule exists in the switch.

* * * * *

UNITED STATES PATENT AND TRADEMARK OFFICE
CERTIFICATE OF CORRECTION

PATENT NO. : 10,033,619 B2
APPLICATION NO. : 15/289249
DATED : July 24, 2018
INVENTOR(S) : Quancai Li Page 1 of 1

It is certified that error appears in the above-identified patent and that said Letters Patent is hereby corrected as shown below:

On the Title Page

Item (56), OTHER PUBLICATIONS, Line 1: "13.4" should be "1.3.4"

Signed and Sealed this
Fourth Day of September, 2018

Andrei Iancu
*Director of the United States Patent and Trademark Office*